United States Patent [19]

Jang

[11] Patent Number: 5,642,408
[45] Date of Patent: Jun. 24, 1997

[54] VIDEOTEX TERMINAL APPARATUS USING AN IBM PC XT

[75] Inventor: Chul-Ho Jang, Seoul, Rep. of Korea

[73] Assignee: Hyundai Electronics Industries Co., Ltd., Kyonggi-do, Rep. of Korea

[21] Appl. No.: 362,255

[22] Filed: Dec. 22, 1994

[30] Foreign Application Priority Data

Dec. 30, 1993 [KR] Rep. of Korea ............. 93-31192

[51] Int. Cl.$^6$ ........................................ H04M 11/00
[52] U.S. Cl. ................................... 379/96; 364/514 A
[58] Field of Search ....................... 379/96–98, 93, 379/90, 110; 364/514 A

[56] References Cited

U.S. PATENT DOCUMENTS

| | | | |
|---|---|---|---|
| 4,691,340 | 9/1987 | Maeda et al. | 379/96 |
| 4,694,406 | 9/1987 | Shibui et al. | 379/96 |
| 4,739,402 | 4/1988 | Maeda et al. | 379/96 |
| 5,025,373 | 6/1991 | Keyser, Jr. et al. | |

FOREIGN PATENT DOCUMENTS

| | | | |
|---|---|---|---|
| 2654536 | 5/1991 | France | 379/96 |

Primary Examiner—Wing F. Chan
Attorney, Agent, or Firm—Morgan & Finnegan L.L.P.

[57] ABSTRACT

A videotex terminal apparatus using a chipset of an IBM PC XT ("XT"), and in particular, to a videotex terminal apparatus using the XT capable of providing high display resolution and easy maintenance using a simple chip set used in the XT in the terminal providing the videotex and the VT-220 is disclosed. The present invention includes a central processing controller for accessing chips therearound and for processing information from a data bus and an address bus, respectively, and for an encoding data related to the videotex, a buffer for buffering an address transferred from the central processing controller and the data received from therearound, a memory for storing the data obtained from the buffer and for outputting a corresponding character and a special code data through a modem controller or a serial communication controller, and a video graphic adapter controller for processing the corresponding character and the special code data obtained from the memory in a form of video signals and for displaying the processed data on the monitor.

3 Claims, 1 Drawing Sheet

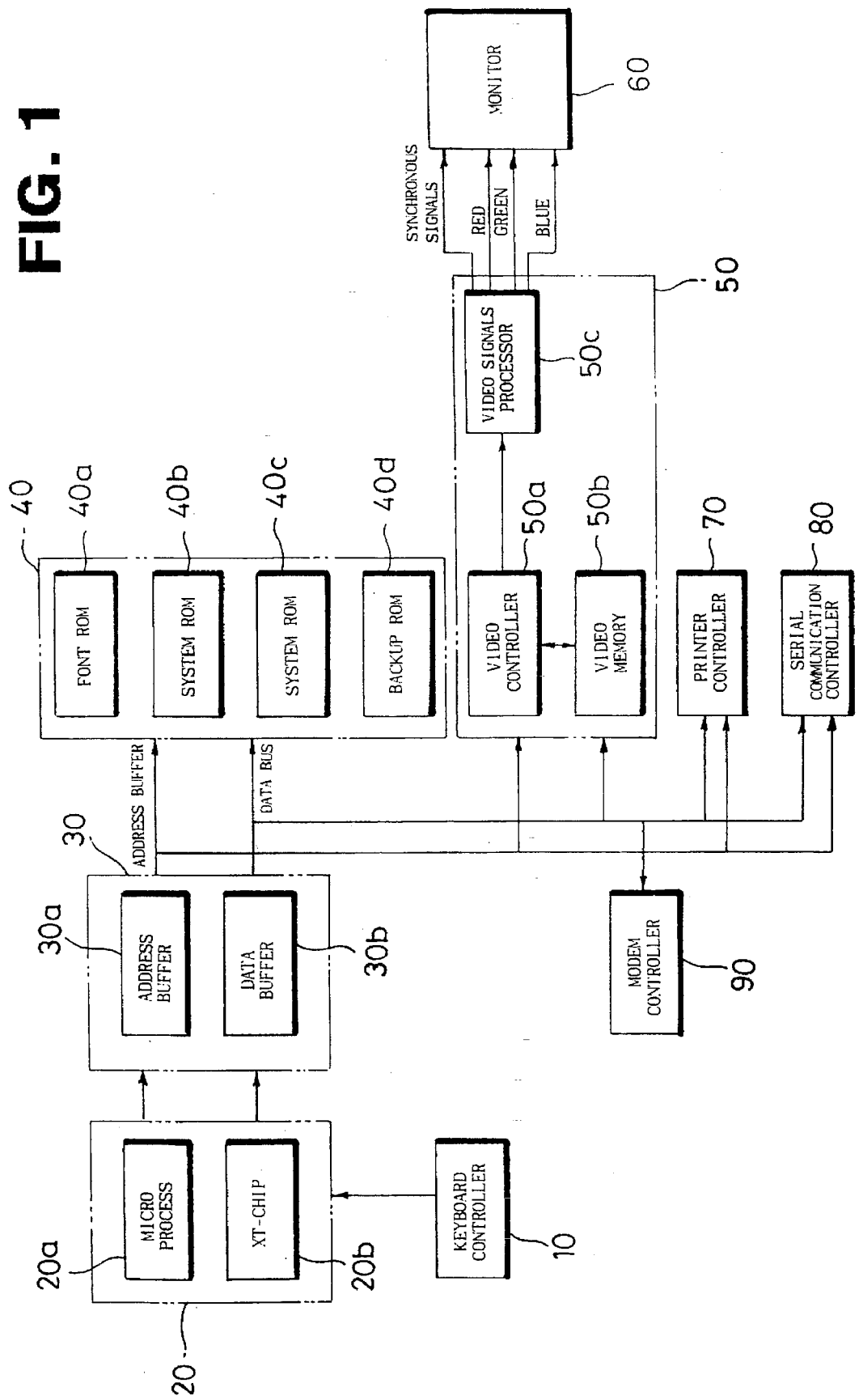

VIDEOTEX TERMINAL APPARATUS USING AN IBM PC XT

BACKGROUND OF THE INVENTION

1. Field of the Invention

The present invention relates in general to a videotex terminal apparatus using a chip set of an IBM PC XT('XT'), and in particular to a videotex terminal apparatus using the XT, capable of providing a high display resolution and easy maintenance using a simple chip set used in the XT in the exclusive terminal providing the videotex and the VT-220.

2. Description of the Conventional Art

Conventionally, a videotex terminal includes a microprocessor and an extra chip including a timer or counter, an address decoder, a chip selector and a controller, which are mounted thereon, so that the circuit of the videotex terminal has a relatively complicated design structure.

Thus high display resolution can not be achieved and the cost of manufacture for the product thereof is high.

SUMMARY OF THE INVENTION

Accordingly, it is an object of the present invention to provide a videotex terminal apparatus using a chip set of an IBM PC XT including a clock generator, a bus controller, a direct memory access controller, an interrupt controller, a timer controller, a central processing unit processing speed converter, an address decoder logic circuit, a system set sum logic, a delay logic, a keyboard interface logic, and the like, which are logically connected to the microprocessor of the videotex terminal, to achieve high display resolution and easy maintenance.

To achieve the object of the present invention, there is included central processing control means for accessing chips therearound and for processing a data bus and an address bus, respectively, and for encoding data related to the videotex; buffer means for buffering an address transferred from the central processing control means and the data received from therearound; memory means for storing the data obtained from the buffer means and for outputting the corresponding character and the special code data through the modem control means or the serial communication control means; and video graphic adapter control means for processing the character and the special code data obtained from the memory means in a form of video signals and for displaying the processed data on the monitor.

BRIEF DESCRIPTION OF THE DRAWINGS

The objects and features of the invention may be more readily understood with reference to the following detailed description of an illustrative embodiment of the invention, taken together with the accompanying drawing in which:

FIG. 1 is a view showing a structure of a videotex using an XT according to the present invention.

DESCRIPTION OF THE PREFERRED EMBODIMENTS

Referring to FIG. 1, the present invention includes a keyboard control circuit 10 for selecting various corresponding commands and for inputting a character, a number, or a special code; a central processing unit control circuit 20 for processing various key signals of the key board control circuit 10 and for encoding the data related to the videotex by separately processing the data bus and the address bus; a buffer circuit 30, consisting of an address buffer circuit 30a and a data buffer 30b, for buffering the data received from the central processing unit control circuit 20 and the data from a peripheral device; a memory circuit 40 for storing the data transferred from the buffer circuit 30 and for outputting the data of the related character and the special codes and for backing up the videotex related data; a modem control circuit 90 for encoding the videotex related data outputted from the memory circuit 40 to the host database system which is located at the remote place and connected to a PSTN(Public Switching Telephone Network) and for accessing the database information; a printer control circuit 70 for transferring the videotex related data outputted from the memory circuit 40 to a printer; a serial communication control circuit 80 for transferring the data at a speed of up to 9600 bps (bit per second) to another terminal or an independent computer; and a video graphic adapter control circuit 50 for processing the videotex related character and the special code data outputted from the memory 40 to the video signals and for displaying the data to the monitor 60.

The central processing unit control circuit 20 includes a microprocessor 20a, having an address bus and data bus, for accessing peripheral devices and for using the main memory up to 64 kbyte and an XT chip set 20b for encoding the video related data by processing the data bus and the address bus outputted from the microprocessor 20a.

In addition, the memory circuit 40 includes a font ROM (Read Only Memory) 40a for outputting font data such as Korean, Chinese, English, and special codes, which are all standard character sets, by the address outputted from the buffer circuit 30 through the data bus; a system ROM 40b of 256 kbyte, having an encode software program of the videotex graphic information and the program of the encode software of a VT-220 character information, for controlling all the operation of the videotex terminal apparatus by the address outputted from the buffer circuit 30; a system RAM(Random Access Memory) 40c for writing/reading the information in on the system ROM 40b and for storing the output data of the buffer circuit 30 by the address outputted from the buffer circuit 30; and a backup RAM 40d of 32 kbyte for outputting the parameter of the videotex encode program of the system ROM 40b and the stored backup data outputted from the buffer circuit 30.

The video graphic adapter control circuit 50 includes a video control circuit 50a for relocating the font data of the font ROM 40a outputted from the microprocessor 20a by the output address of the buffer circuit 30 and for storing the relocated data into the memory circuit 50b and for outputting the video data and a video signal processing unit 50c for processing the video data obtained from the video control circuit 50a in a form of Red, Green and Blue color signals and for displaying the data on the monitor 60.

The operation of and effects of the present invention will now be explained.

To begin with, when the key signals are inputted from the keyboard control circuit 10, the XT chip 20b of the central processing unit control circuit 20 processes the address and the data outputted from the microprocessor 20a and inputs the processed data into the address buffer 30a and the data buffer 30b of the buffer circuit 30.

The address buffer 30a and the data buffer 30b of the buffer 30 buffer the input address and the data so that the data can not interfere with each other and transfer the data to the memory circuit 40, the video graphic adapter control circuit 50, the printer control circuit 70, the serial communication circuit 80 and the modem control circuit 90, respectively.

The font ROM 40a of the memory circuit 40 selects the corresponding font from the standard character set such as Korean, Chinese, English or special codes which are stored by the address inputted from the buffer circuit 30 and outputs the font data through the data bus.

Meanwhile, the system ROM 40b having the encode software of the videotex graphic information and the encode software of the VT-220 character information encodes the font data, outputted from the font ROM 40a by the address outputted from the buffer circuit 30, by the microprocessor 20a and transfers the decoded data to the video graphic adapter control circuit 50, the printer control circuit 70, the serial communication control circuit 80 and the modem control circuit 90. The system RAM 40c writes or reads the information stored at the system ROM 40b of the memory circuit 40 and stores the data outputted from the buffer circuit 30 therein.

In addition, the 32 kbyte backup RAM 40d of the memory circuit 40 backs-up the parameter of the videotex encode program stored in the system ROM 40b and the data inputted from the buffer circuit 30.

The video control circuit 50a of the videotex graphic adapter control circuit 50 relocates the font data inputted through the data bus by the address inputted from the buffer circuit 30 and stores the relocated data into the memory circuit 50b and reads the stored video data and inputs the read data into the video signal processing circuit 50c.

The video signal processing circuit 50c processes the video data outputted from the video graphic adapter control circuit 50a in a form of Red, Green and Blue color signals and displays the processed data on the screen.

Meanwhile, the printer control circuit 70 outputs the videotex related data to the printer connected to the printer port of the terminal in order to print the font data outputted from the font ROM 40a of the memory circuit 40.

In addition, the serial communication control circuit 80 is directed to the data transferring and receiving process with the terminal or the independent computer.

Moreover, the data codes received from the database through a 2400 bps modem disposed in the terminal are processed at the system ROM 40b in which the videotex encode software is installed, in case that the video data are processed, it is processed through the access signals of the video memory circuit 50b outputted from the video graphic adapter control circuit 50.

The present invention has the effects of facilitating high display resolution and easy maintenance by mounting a chip set used in an IBM PC XT at the videotex terminal, so that the number of parts thereof are significantly reduced and therefore decreasing the cost of production.

What is claimed is:

1. A videotex terminal apparatus using an IBM PC XT, comprising:

central processing control means for accessing chips therearound and for processing information from a data bus and an address bus, respectively, and for encoding data related to the videotex;

buffer means for buffering an address transferred from the central processing control means and the data received from therearound;

memory means for storing the data obtained from the buffer means and for outputting a corresponding character and a special code data through a model control means or a serial communication control means; and video graphic adapter control means for processing the character and the special code data obtained from the memory means in a form of video signals and for displaying the processed data on the monitor.

2. The apparatus of claim 1, wherein said central processing control means includes a microprocessor for outputting an address bus and a data bus to the information detecting terminal and a XT chip for processing information from a data bus and an address bus, respectively, outputted from the microprocessor and for encoding the videotex related data.

3. A videotex terminal apparatus using an IBM PC XT, comprising:

central processing control means for accessing chips therearound and for processing information from a data bus and an address bus, respectively, and for encoding data related to the videotex;

buffer means for buffering an address transferred from the central processing control means and the data received from therearound;

memory means for storing the data obtained from the buffer means and for outputting a corresponding character and a special code data through a modem control means or a serial communication control means; and video graphic adapter control means for processing the character in the special code data obtained from the memory means in a form of video signals and for displaying the processed data on a monitor, said video graphic adapter control means including a video control circuit for relocating a font data of the memory means outputted from the microprocessor by the output address of the buffer circuit, for storing the relocated data into the video memory circuit and for outputting the video signals, and a video signal processing circuit for processing the video data obtained from the video control circuit in a form of Red, Green, and Blue color information and for displaying the processed data on the monitor.

* * * * *